(12) United States Patent
Stolfo

(10) Patent No.: US 11,084,540 B2
(45) Date of Patent: Aug. 10, 2021

(54) UTILITY VEHICLE TRAY DECK SURFACE APPARATUS, SYSTEM, AND METHOD

(71) Applicant: Aluminum Industries Investments Pty Ltd, Brighton (AU)

(72) Inventor: Anthony Stolfo, Brighton (AU)

(73) Assignee: Aluminum Industries Investments Pty Ltd, Brighton (AU)

(*) Notice: Subject to any disclaimer, the term of this patent is extended or adjusted under 35 U.S.C. 154(b) by 153 days.

(21) Appl. No.: 16/685,540

(22) Filed: Nov. 15, 2019

(65) Prior Publication Data

US 2020/0079439 A1 Mar. 12, 2020

Related U.S. Application Data

(63) Continuation of application No. PCT/AU2018/050474, filed on May 17, 2018.

(51) Int. Cl.
*B62D 33/023* (2006.01)
*B62D 33/027* (2006.01)
(Continued)

(52) U.S. Cl.
CPC ............ *B62D 33/023* (2013.01); *B60R 13/04* (2013.01); *B62D 27/026* (2013.01); *B62D 33/027* (2013.01); *B62D 33/04* (2013.01)

(58) Field of Classification Search
CPC .... B62D 33/023; B62D 33/027; B62D 33/03; B62D 33/04; B62D 27/026; B62D 27/06;
(Continued)

(56) References Cited

U.S. PATENT DOCUMENTS 4,878,273 A * 11/1989 West .................. B60R 13/04
24/289
4,946,727 A * 8/1990 Kessler ................ B60R 13/04
428/99
(Continued)

FOREIGN PATENT DOCUMENTS

| CN | 104773216 A | 7/2015 |
|---|---|---|
| EP | 1826740 A1 | 8/2007 |
| GB | 2535317 A | 8/2016 |

OTHER PUBLICATIONS

International Search Report, International Application No. PCT/AU2018/050474.
(Continued)

*Primary Examiner* — Gregory A Blankenship
(74) *Attorney, Agent, or Firm* — Richard A. Fagin

(57) ABSTRACT

Apparatus for a tray deck for providing a selectable appearance outer surface for at least one component of the tray deck, the apparatus including for the at least one component a component substrate (902) including a plurality of connectors (907, 908, 909, 910, 911, 912, 913, and 914) for accepting a plurality of complementary connectors (922, 924, 926) on a panel (900) having a selected appearance for connection to the component substrate, wherein the panel, when connected to the component substrate, comprises at least part of the surface presenting outwardly of the tray deck, wherein each of the plurality of connectors on the component substrate includes an elongate protrusion (907, 909, 911) depending outwardly from the component substrate and along an edge of the elongate protrusion distal from the component substrate each connector including an elongate grooved connector (908, 910, 912), the elongate grooved connector configured to accept a complementary elongate projection (922, 924, 926) of the panel.

20 Claims, 9 Drawing Sheets

(51) Int. Cl.
*B62D 27/02* (2006.01)
*B60R 13/04* (2006.01)
*B62D 33/04* (2006.01)

(58) Field of Classification Search
CPC ........ B62D 65/02; B62D 65/16; B62D 39/00;
B60R 13/04
USPC ...... 296/191, 193.04, 193.03, 193.05, 181.1,
296/181.3, 186.1, 186.5, 183.1, 1.01
See application file for complete search history.

(56) References Cited

U.S. PATENT DOCUMENTS

| | | | |
|---|---|---|---|
| 5,044,688 A | 9/1991 | Jacobson | |
| 5,050,351 A * | 9/1991 | Goldbach | B60J 5/0469 49/502 |
| 5,058,843 A * | 10/1991 | Koster | B60R 13/04 248/223.41 |
| 5,188,408 A * | 2/1993 | Berdan | B60R 13/04 293/128 |
| 5,228,742 A * | 7/1993 | Johnson | B62D 29/048 296/183.1 |
| 5,229,175 A * | 7/1993 | Seabolt | B60R 13/04 24/289 |
| 5,345,721 A * | 9/1994 | Stein | B60J 5/0468 296/146.7 |
| 5,636,883 A * | 6/1997 | Johns | B60J 11/06 150/166 |
| 5,647,631 A * | 7/1997 | Lee | B60J 5/0481 296/146.5 |
| 5,704,678 A | 1/1998 | Elwell et al. | |
| 5,984,401 A * | 11/1999 | Hannah | B60J 11/00 248/205.9 |
| 6,086,139 A * | 7/2000 | Heim | B60J 5/0405 296/146.5 |
| 7,163,258 B2 * | 1/2007 | Dyer, II | B62D 25/02 280/768 |
| 9,067,482 B1 | 6/2015 | Ferlinghetti | |
| 9,731,775 B1 * | 8/2017 | Tsumiyama | B62D 33/023 |
| 10,358,018 B2 * | 7/2019 | Lange | B60J 5/0469 |
| 2003/0057729 A1 | 3/2003 | Morris | |
| 2003/0094835 A1 * | 5/2003 | Yoshida | B60R 13/04 296/209 |
| 2004/0164580 A1 * | 8/2004 | Armstrong | B62D 33/023 296/50 |
| 2004/0178661 A1 * | 9/2004 | Filipczak | B60J 10/45 296/181.1 |
| 2005/0016116 A1 | 1/2005 | Scherff | |
| 2007/0132278 A1 * | 6/2007 | Lester | B62D 29/048 296/191 |
| 2009/0115222 A1 * | 5/2009 | Hohnl | B60Q 3/30 296/183.1 |
| 2010/0007169 A1 | 1/2010 | Nguyen | |
| 2010/0212252 A1 * | 8/2010 | Chou | B60R 13/04 52/716.5 |
| 2011/0121610 A1 * | 5/2011 | Stanton | B62D 27/023 296/191 |
| 2012/0025560 A1 | 2/2012 | Huotari et al. | |
| 2015/0123425 A1 * | 5/2015 | Huston | B60P 7/0815 296/183.1 |
| 2015/0175220 A1 * | 6/2015 | Jones | B62D 27/026 296/191 |
| 2017/0002477 A1 * | 1/2017 | Yoshizawa | C09D 5/08 |
| 2020/0079411 A1 * | 3/2020 | Collongues | G01M 99/00 |
| 2020/0079439 A1 * | 3/2020 | Stolfo | B62D 33/04 |
| 2020/0079440 A1 * | 3/2020 | Keen | B62D 25/2054 |
| 2020/0406985 A1 * | 12/2020 | Zhu | B60R 9/06 |
| 2021/0031840 A1 * | 2/2021 | Andersson | B62D 25/2036 |

OTHER PUBLICATIONS

Written Opinion, International Application No. PCT/AU2018/050474.

* cited by examiner

UTILITY VEHICLE TRAY DECK SURFACE APPARATUS, SYSTEM, AND METHOD

CROSS-REFERENCE TO RELATED APPLICATIONS

Continuation of International Application No. PCT/AU2018/050474 filed on May 17, 2018. Priority is claimed from Australian application no. 2017901873 filed on May 17, 2017. The foregoing applications are incorporated herein by reference.

BACKGROUND

The present invention relates to decks and tray decks for vehicles, and particularly relates to decks and tray decks for utility type vehicles.

Utility vehicles, sometimes referred to as utes, pick-ups or pick-up trucks, typically are equipped with a tray or tray deck at the rear of the vehicle, which serves to carry loads of various types. The loads may include equipment, sand, gravel and various other kinds of items and materials.

Some utility vehicles have a flat area, which may be referred to as a tray, a cargo bed or a deck. Other utility vehicles have a flat area which is surrounded by up to four sides to form a container, which may also be referred to variously as a tray or a cargo bed. The sides may be fixed or moveable, and may be a combination of fixed and moveable sides. Sometimes the side at the back is referred to as a tail gate.

In this specification, for consistency and ease of understanding, the vehicle will be referred to as a utility or utility vehicle; the flat area will be referred to as a deck; each of the sides will be referred to as side gates (front, rear, left and right); and the deck and side gates together (whether there be one, two, three or four side gates) will be referred to as a tray deck.

In some utility vehicles, the sides of the tray deck are fixed in position, the deck and sides forming what is sometimes referred to as a tub. In other utility vehicles, one or more of the sides are moveable between open and closed configurations. In this specification, unless otherwise indicated, the term side gate will refer to a side of a tray deck, wherein the side gate is moveable at least between open and closed positions. Some utility vehicles have side gates which are detachable. Typically, if a utility vehicle tray deck has a front side (usually adjacent a cab of the utility vehicle), the front side is in a fixed position, and in this specification the front side may be referred to as a fixed side or also referred to as a side gate, though it will be understood that the front side is typically in a fixed position.

Typically, a deck or tray deck will be provided with a utility vehicle when sold to a customer. The type of tray deck is either dictated by the model of the vehicle or there may be a very limited range of options available from which a customer can select.

It is also possible to buy utility vehicles without a deck or tray deck fitted, and the customer can select a deck or tray deck for their vehicle after purchase, but the customer will have a very limited range of options for a deck or tray deck.

Further, decks and tray decks are typically manufactured or supplied as a single unit, and can be fitted only to one vehicle model or a very limited range of vehicle models. Such units are bulky, which causes them to be inconvenient and expensive to transport, for example, form a place of manufacture to a place where the deck or tray deck is to be fitted to a utility vehicle.

Many decks and tray decks are not configurable or may have very limited options for configuration. A customer may want to include various features to make a deck or tray deck more suitable for that customer's intended use of the utility vehicle.

Decks and tray decks typically have a very square appearance, being manufactured for industrial purposes and for fitting to a range of vehicles. More recently, shaped tray decks have become popular, where the surface, outer shell, or skin of the deck, the tray deck, the side gates, the deck sides, and other components having an outward facing part, is formed to have a shape, often similar in styling with the vehicle on which the deck or tray is placed. However, due to the particular shapes of vehicle models, these decks or tray decks with shaped, surfaces, outer shells, or skins have been restricted to being appropriate only for one vehicle model or a small range of vehicle models with a shape and/or styling matching the shape and/or styling of the surface, outer shell, or skin of the deck or tray deck.

It is an object of the present invention to overcome, or at least ameliorate, at least one of the above-mentioned problems in the prior art, and/or to overcome, or at least ameliorate, at least one problem in the prior art, which has not been mentioned above and/or to provide at least a useful alternative to prior art devices, systems and/or methods.

SUMMARY OF THE INVENTION

1. In one aspect, the present invention provides apparatus for a tray deck for providing a selectable appearance outer surface for at least one component of the tray deck, the apparatus including:

for the at least one component:

a component substrate including a plurality of connectors for accepting a plurality of complementary connectors on a panel having a selected appearance for connection to the component substrate, wherein the panel, when connected to the component substrate, comprises at least part of the surface presenting outwardly of the tray deck, wherein each of the plurality of connectors on the component substrate includes an elongate protrusion depending outwardly from the component substrate and along an edge of the elongate protrusion distal from the component substrate each connector including an elongate grooved connector, the elongate grooved connector configured to accept a complementary elongate projection of the panel.

In another aspect, the present invention provides a system for a tray deck for providing a selectable appearance outer surface for at least one component of the tray deck, the system including:

for the at least one component:

a component substrate including a plurality of connectors for accepting a plurality of complementary connectors on a panel having a selected appearance for connection to the component substrate, wherein the panel, when connected to the component substrate, comprises at least part of the surface presenting outwardly of the tray deck, wherein each of the plurality of connectors on the component substrate includes an elongate protrusion depending outwardly from the component substrate and along an edge of the elongate protrusion distal from the component substrate each connector including an elongate grooved connector, the elongate grooved connector configured to accept a complementary elongate projection of the panel; and the panel.

In another aspect, the present invention provides a method for a tray deck for providing a selectable appearance outer surface for at least one component of the tray deck, the method including:

providing an at least one component of the tray deck including a component substrate including a plurality of connectors for accepting a plurality of complementary connectors on a panel having a selected appearance for connection to the component substrate, wherein the panel, when connected to the component substrate, comprises at least part of the surface presenting outwardly of the tray deck, wherein each of the plurality of connectors on the component substrate includes an elongate protrusion depending outwardly from the component substrate and along an edge of the elongate protrusion distal from the component substrate each connector including an elongate grooved connector, the elongate grooved connector configured to accept a complementary elongate projection of the panel; and, providing a panel, the method further including:

connecting the panel with the component substrate using the plurality of connectors of the component substrate and the plurality of complementary connectors on the panel.

SUMMARY OF SOME OPTIONAL EMBODIMENTS OF THE INVENTION

In embodiments, the at least one component includes any one or more of a side gate, a deck side, a side gate corner, a deck corner, and a wheel arch. In some embodiments, the at least one component includes multiples of the side gate, the deck side, a side gate corner, a deck corner, and the wheel arch.

In embodiments, the means for accepting of the component substrate includes an at least one ridge on the component substrate operable with an at least one corresponding channel of the panel, wherein the channel is configured for a force fit on the ridge. Alternatively, the means for accepting of the component substrate includes an at least one channel on the component substrate operable with an at least one corresponding ridge of the panel, wherein the channel is configured for a force fit on the ridge.

In further embodiments, the means for accepting of the component substrate includes an at least one ridge and an at least one channel on the component substrate operable, respectively, with an at least one corresponding channel of the panel and an at least one corresponding ridge of the panel, wherein the channel is configured for a force fit on the ridge.

In other embodiments, the means for accepting of the component substrate includes one or more clips, operable to clip and hold the panel to the component substrate. In other embodiments, the means for accepting of the component substrate includes threaded or threadable bores for accepting threaded fasteners, such as screws and bolts.

In yet other embodiments, the means for accepting of the component substrate includes an at least one channel on the component substrate, operable to accept an edge of the panel, such that the panel can be bonded to the component substrate. In some such embodiments, the bonding may be by adhesive. In other such embodiments, the bonding may be by welding.

In various embodiments, the apparatus, system and method, is adapted so that the panel can be disconnected from the component substrate. This may be useful for selectively changing the appearance of the outer surface of a vehicle, or may be useful to replace panels which have been damaged, for example, in and automotive accident.

It will be appreciated that there many means and methods for connecting a panel with a corresponding component substrate. It will also be appreciated that panels may have a range of different shapes, some to be suitable, for example, for blending the appearance of a utility vehicle tray deck with the utility vehicle cab, some may be suitable for providing a chosen fancy appearance, which may juxtapose with the appearance of a vehicle's styling.

BRIEF DESCRIPTION OF THE DRAWINGS

At least one embodiment of the invention will be described with reference to the following, non-limiting illustrations representing the at least one embodiment of the present invention, in which.

DETAILED DESCRIPTION OF SOME EMBODIMENTS

Figure 1:
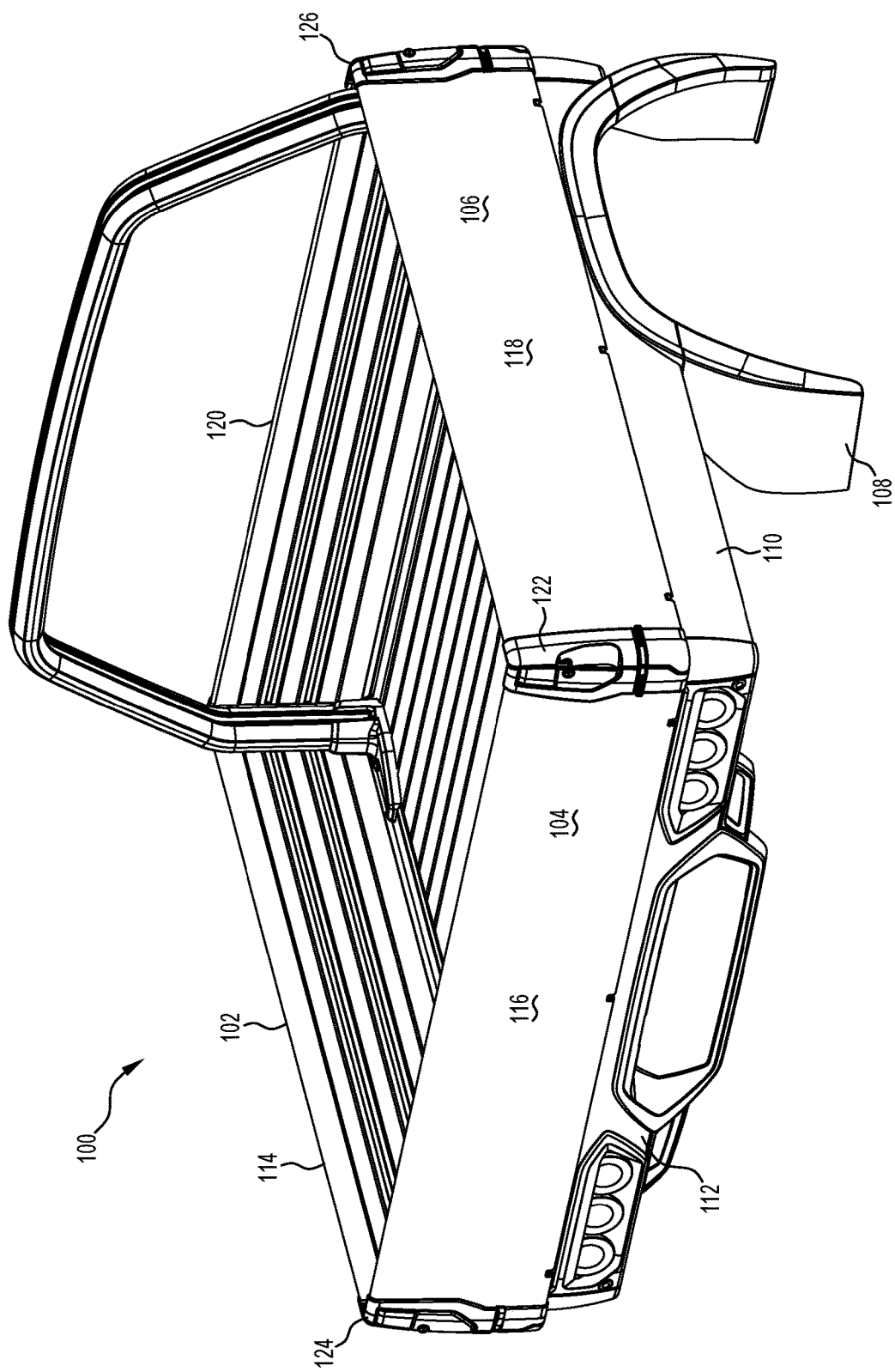
FIG. 1 is a perspective view of a utility vehicle tray deck showing side gate substrates without panels, in accordance with an embodiment of the present invention.

FIG. 1 shows a tray deck 100 of a utility vehicle, the tray deck including side gates on the deck, a left side gate 102, a rear side gate 104, right side gate 106 and a front side gate 120. The left and right sides being defined from a rear perspective of the tray deck. Each side gate includes a side gate substrate, with the left side gate component 114, the rear side gate component 116, and the right side gate component 118. The side gates are shown without panels, and so, in this embodiment, the depicted side gate components are shown a single skin, comprising the internal skin (or internal surface) of each side gate when a panel is attached thereto. The side gate components are depicted as having a plain exterior surface, but the side gate substrates may have shape details, such as the reverse side of channels, which are open to the interior of the tray deck when the side gates are closed. Such shape details of the side gate substrates have been omitted from FIG. 1 and others of the Figures for simplicity.

Front side gate 120 does not comprise a side gate component (or a panel connected thereto) as it is not visible as an outside surface when the tray deck is mounted to a utility vehicle.

The tray deck also includes various components which, in this depicted embodiment, do not make use of the invention, including the deck sides (rear deck side 112 and right deck side 110), the side gate corners 122, 124, and 126 (the fourth deck corner not shown in FIG. 1), and the wheel arch 108. It will be appreciated that, in other example application of embodiments of the invention, any one or more of those components could have the invention applied (see, for example, FIGS. 9, 10 and 11 which depict panels applied to deck sides).

Figure 2:
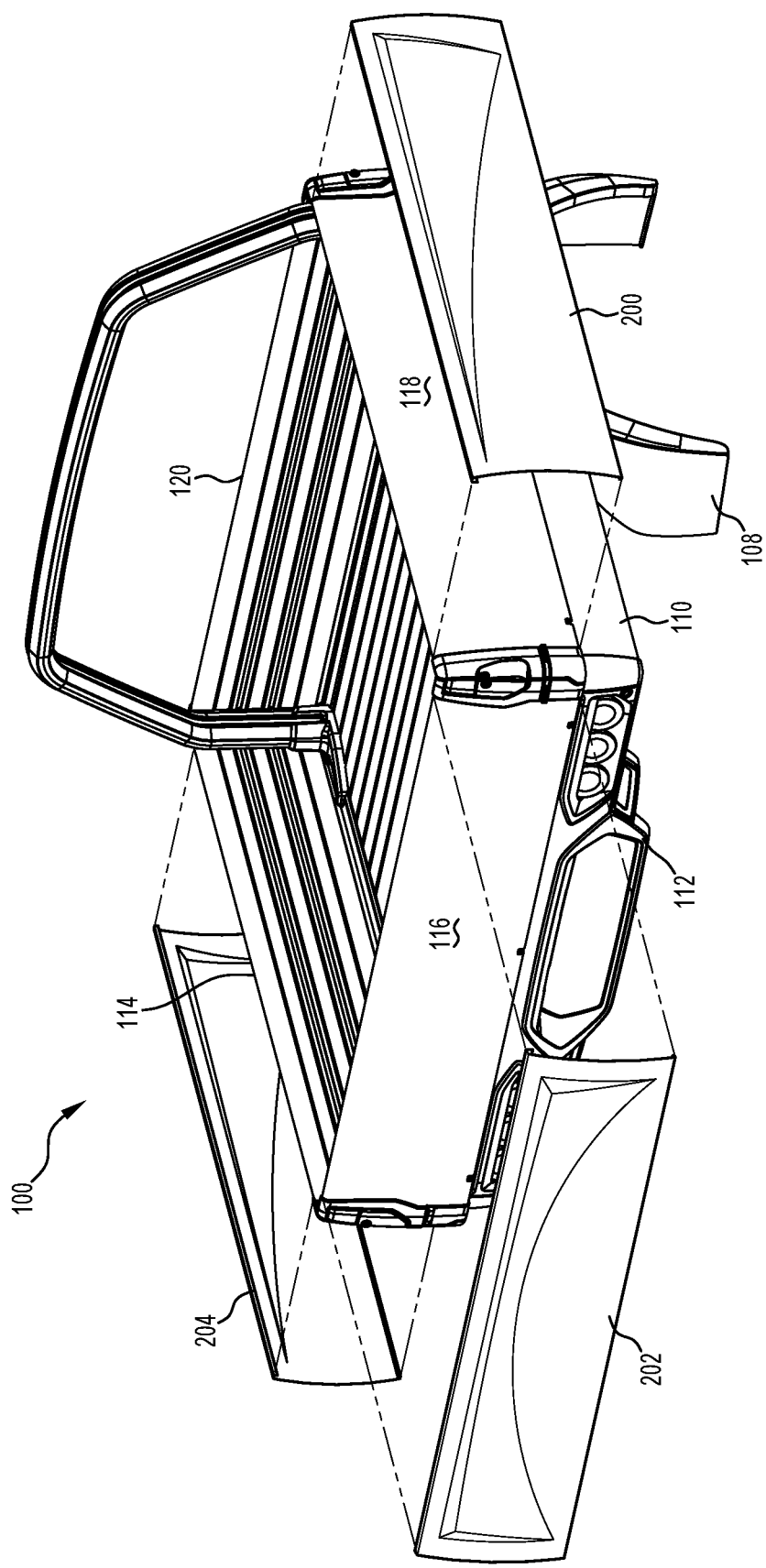
FIG. 2 is a similar view to FIG. 1, with the utility vehicle tray deck and panels to be fitted to the tray deck shown in exploded view, in accordance with an embodiment of the present invention.

FIG. 2 shows panels which are to be fitted to the side gate components to form an outer skin of the side decks. Panel 200 corresponds with right side gate component 118, panel 202 corresponds with rear side gate component 116, and panel 204 corresponds with left side gate component 114.

Each panel 200, 202, and 204 has a design which suitable for its corresponding side gate. In this embodiment, the designs for each panel are different for each side gate. It will be appreciated that the panels may have a variety of designs, including a variety of shapes, a variety of colours, and a variety of patterns. The design of a panel may be decided by a manufacturer, for example, to accord with other design elements in a vehicle, or can be chosen by a customer when buying a vehicle. Further, in some embodiments, the panels may be detachable so that a different panel can be chosen according to the taste of the owner of a vehicle.

Figure 3:
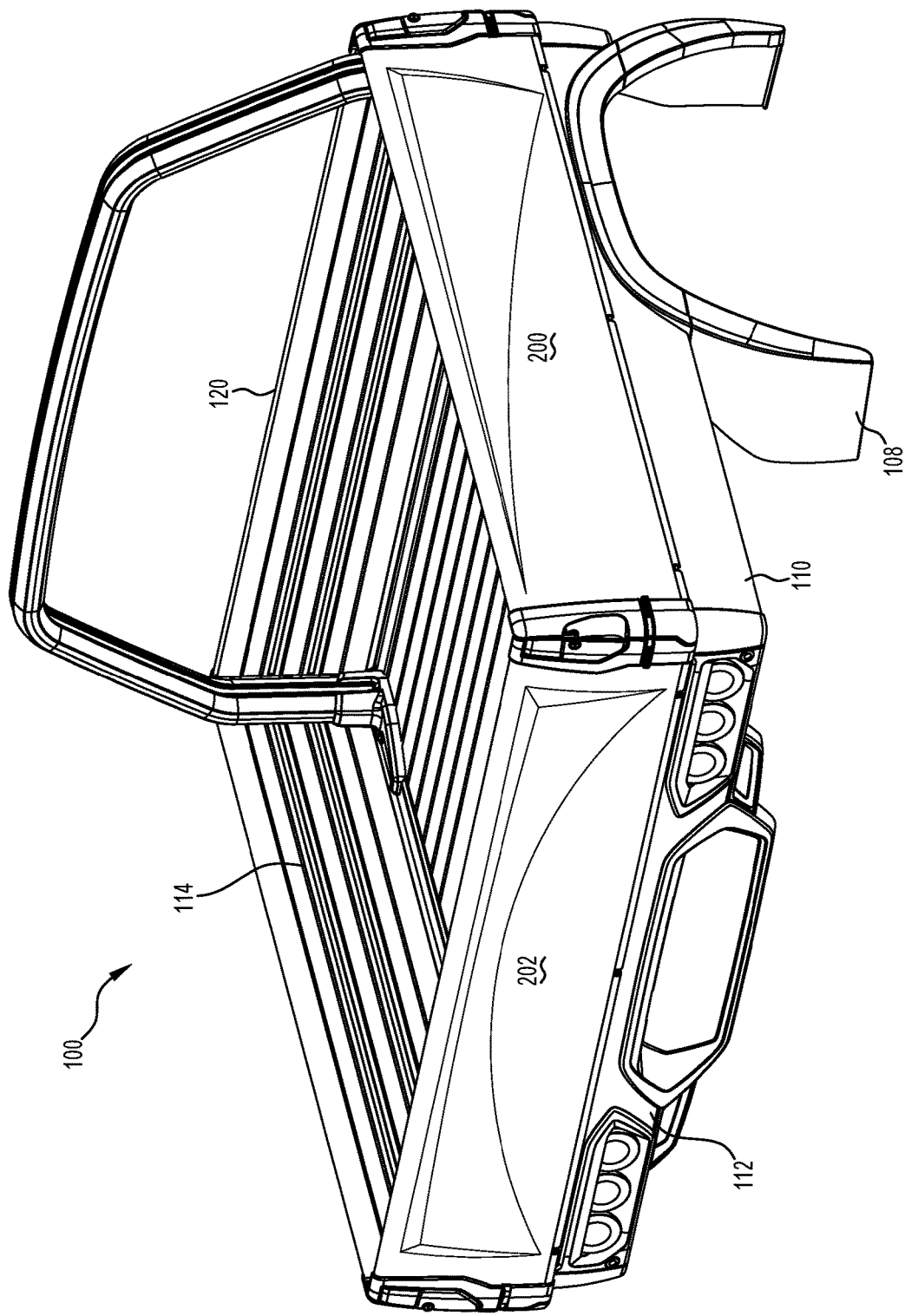
FIG. 3 is a similar view to FIG. 2, with the panels connected, in accordance with an embodiment of the present invention.

FIG. 3 shows panels 200 and 202 connected, respectively, to right side gate component 118 and rear side gate component 116. As depicted the side gate components 118 and 116 cannot be seen. The panel 204 is connected to left side gate component 114, but that panel cannot be seen in FIG. 3.

The panels and side gate components, when connected together form double skin side gates, wherein the side gate components comprise internal surfaces (or skins), facing inwardly towards the tub of the tray deck 100, and the panel comprise external surface (or skins), facing outwardly from the tub of the tray deck.

Figure 4:
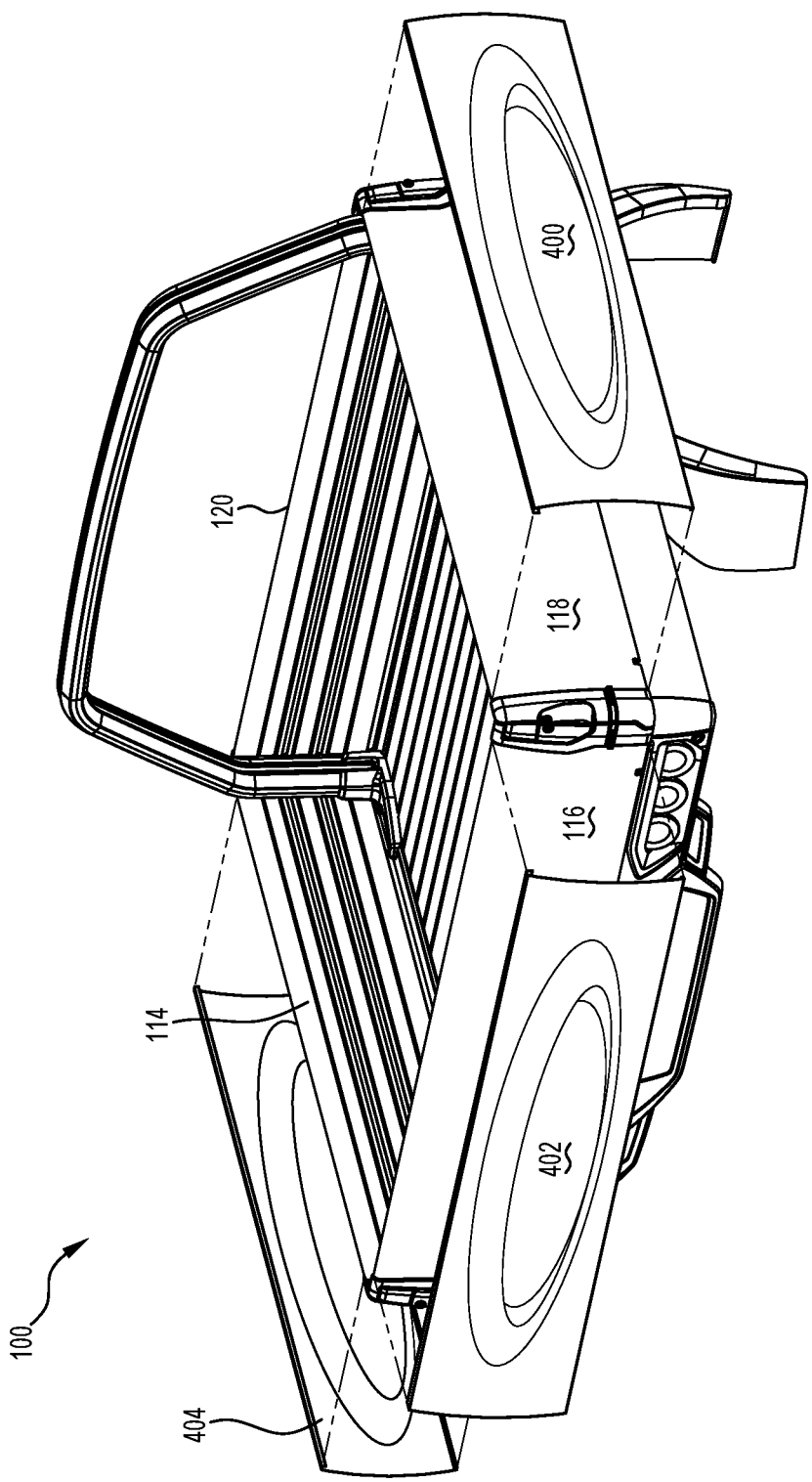
FIG. 4 is a similar view to FIG. 2, with panels having a different outward appearance from the panels depicted in FIG. 2, in accordance with an embodiment of the present invention.

FIG. 4 shows panels with a different design from that shown in FIGS. 2 and 3, the left side panel 404 to be connected (or fitted) to left side gate component 114 to form the double-skinned left side gate 102, the rear side gate panel 402 to be connected (or fitted) to rear side gate component 116 to form the double-skinned rear side gate 104, and the right side panel 400 to be connected (or fitted) to right side gate component 118 to form the double-skinned right side gate 106.

In FIG. 4, each panel 400, 402, 404 has a same or similar design with an annular ellipse protruding from the surface of each panel.

Figure 5:
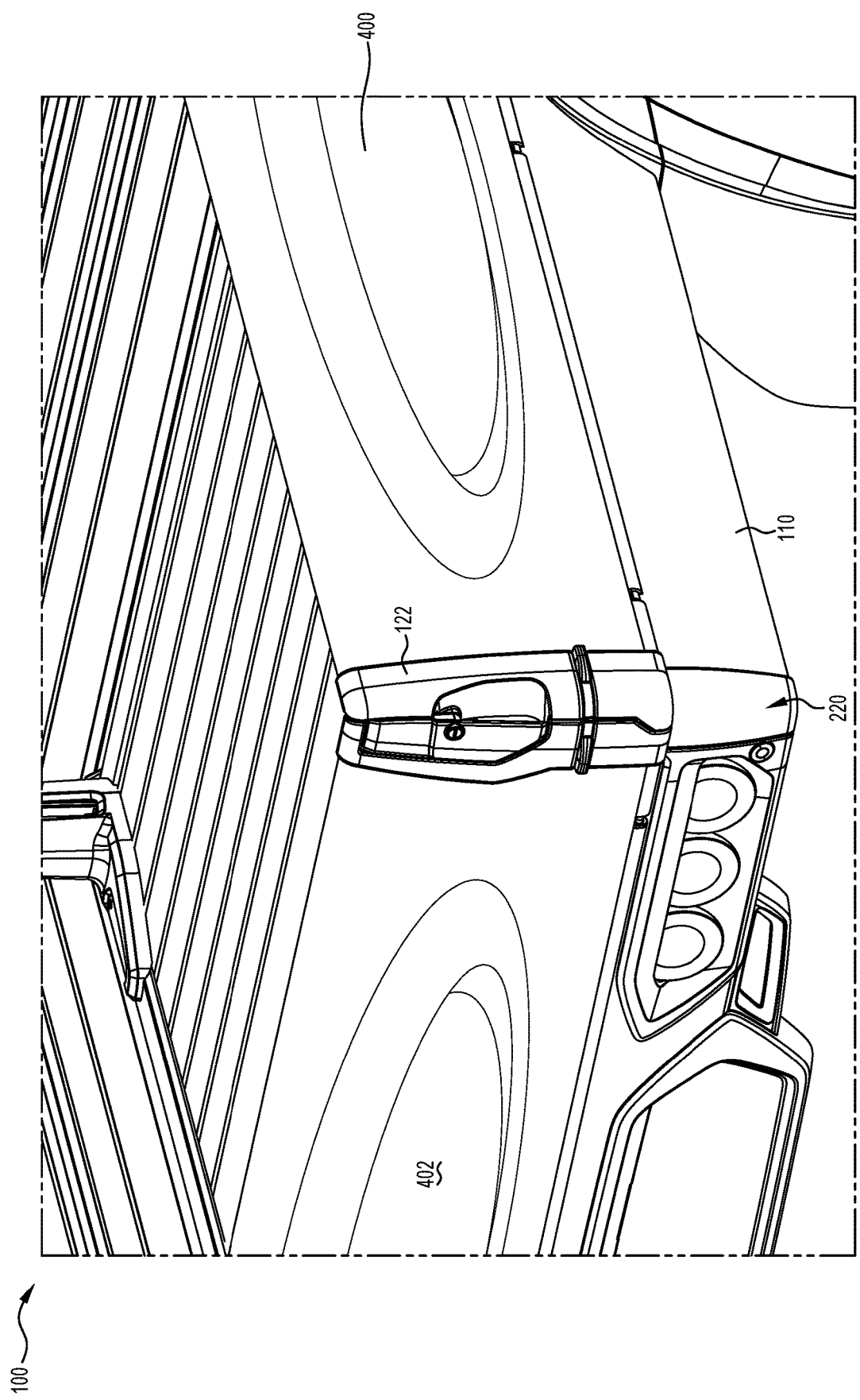
FIG. 5 is a perspective view of a tray deck corner, with the side gates of the tray deck fitted with panels in accordance with an embodiment of the present invention.

FIG. 5 shows a close up of around the corner 122 of the tray deck 100, with panels 400 and 402, respectively, connected to their corresponding side gate components.

Figure 6:
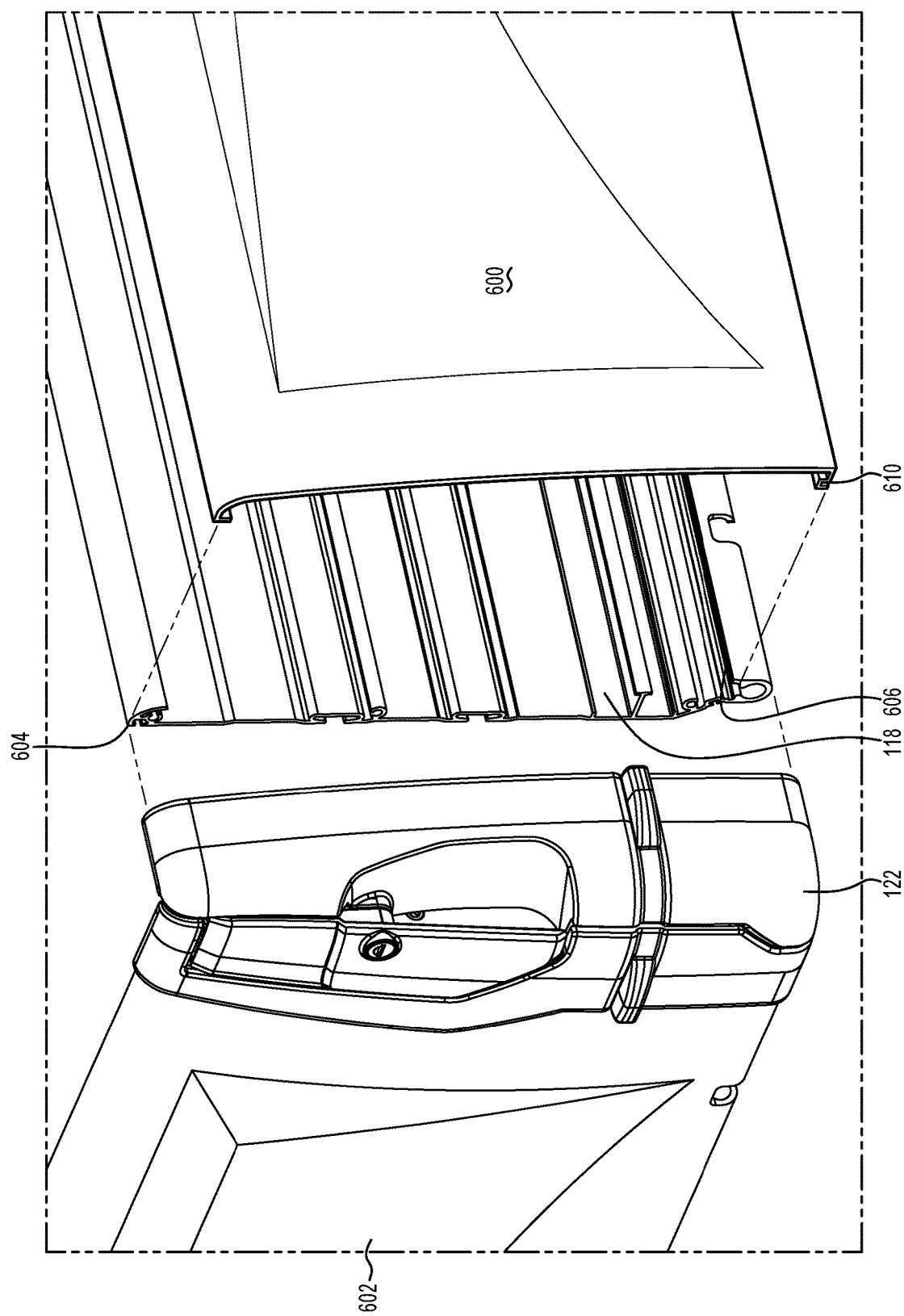
FIG. 6 is a perspective view of a tray deck corner, with the side gates of the tray deck fitted with panels having a different outward appearance from the panels depicted in FIG. 5, and with one panel shown in exploded view, in accordance with an embodiment of the present invention.

FIG. 6 shows a close up of around the corner 122 of the tray deck 100, with a panel 602 connected to the rear side gate component 116 (not shown), and with a panel 600 disconnected from (or not yet connected to) right side gate component 118. An embodiment of a means for accepting the panel 600 is shown on the right side gate component with top ridge 604 along the top edge of the right side gate component (or comprising the top edge of the right side gate component), and bottom ridge 606 protruding upwardly from the bottom edge of right side gate component 118. The top ridge 604 is configured to accept a channel (or fold) 608 along the top edge of panel 600, and the bottom ridge is configured to accept a channel 610 along the bottom edge of panel 600. When fitting the panel 600 to the gate component substrate, the ridges 604, 606 and channels 608 and 610 connect using a force fit allowed for by the configuration of the ridges and channels.

Figure 7:
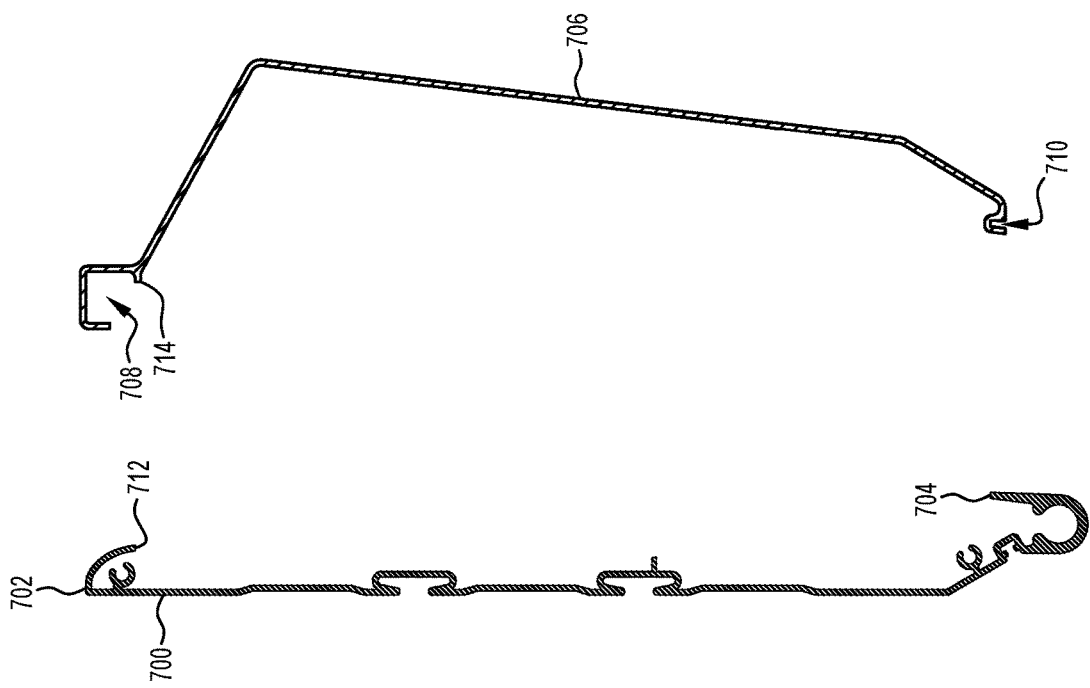
FIG. 7 is an end cross-sectional view of a side gate and a panel, the panel shown as disconnected from the side gate substrate; and, FIG. 8 is a similar view to that of FIG. 7, with the panel shown as connected to the side gate substrate (an example component substrate)

FIG. 7 shows a different example of a panel 706 disconnected from (or not yet connected to) a side gate substrate 700. The side gate substrate includes top ridge 702, and bottom ridge 704, respectively, to accept channel 708 and channel 710. A further detail of the means of connecting the side gate component and the panel can be seen with a further ridge 712 protruding downwardly from the top ridge 702, and a lip 714 protruding from a lower part of the panel channel 708, towards the side gate component (when fitted).

Figure 8:
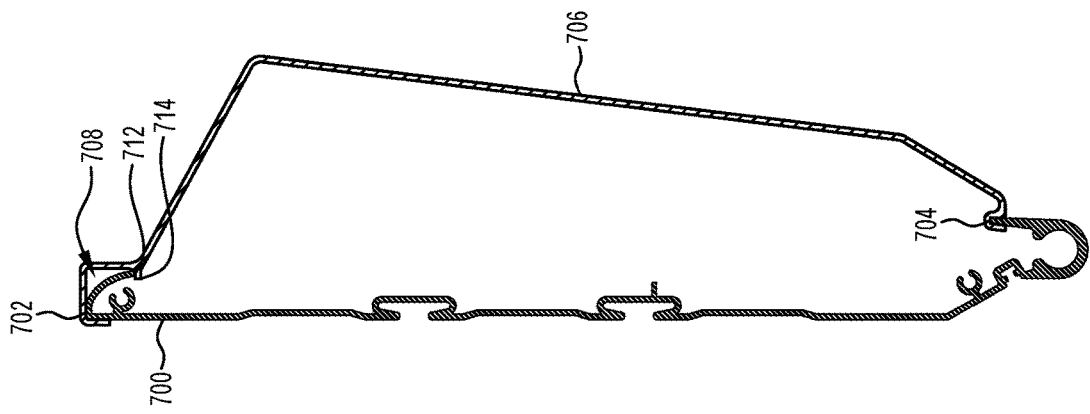

FIG. 8 shows panel 706 connected to side gate component 700.

Figure 9:
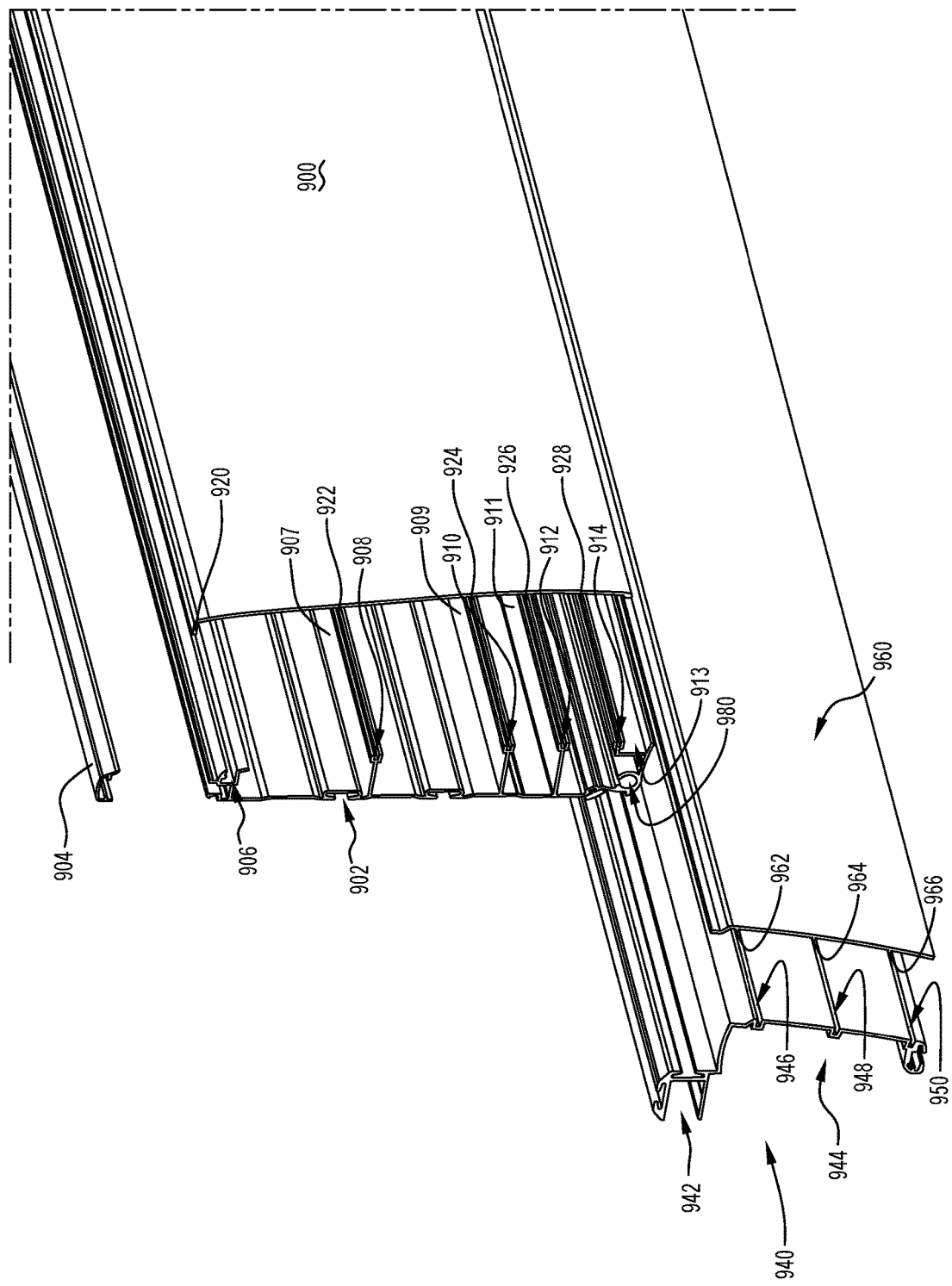
FIG. 9 is an exploded rear perspective view side gate substrate and a side gate panel, the side gate panel shown as disconnected from the side gate substrate, along with a deck side substrate and deck side panel, the deck side panel shown as disconnected from the deck side substrate, in accordance with a different embodiment of the present invention from that shown in previous Figures.

FIG. 9 shows another embodiment where the means of connecting a panel to a component substrate is different from that shown in FIGS. 6, 7, and 8. Further, FIG. 9 shows both a side gate component 902 and a deck side component 940 can have panels connected thereto.

The side gate component substrate 902 depicted in FIG. 9 includes various connection pints between the substrate 902 and the panel 900 to be fitted thereto. The substrate includes a top lip formed from the bottom side of channel 906, a first elongate protrusion 907 depending outwardly from the substantially planar internal face of the side gate component substrate 902, a second elongate protrusion 909 depending outwardly from the substantially planar internal face of the side gate component substrate 902, a third elongate protrusion 911 depending outwardly from the substantially planar internal face of the side gate component substrate 902, and a fourth elongate protrusion 913 depending upwardly from a lower portion of the substantially planar internal face of the side gate component substrate 902.

In FIG. 9, each of the first 907, second 909, third 911, and fourth 913 elongate protrusions include an elongate grooved connector along their respective protrusion on an edge of the protrusion distal from the side gate component substrate, wherein each grooved connector projects outwardly away from the substantially planar internal face of the side gate component substrate 902. The first elongate protrusion 907 includes first elongate grooved connector 908, the second elongate protrusion 909 includes second elongate grooved connector 910, the third elongate protrusion 911 includes third elongate grooved connector 912, and the fourth elongate protrusion 913 includes fourth elongate grooved connector 914.

The panel 900 depicted in FIG. 9 includes elongate projections, each configured to fit, respectively, into a corresponding elongate grooved connector on the side gate component substrate 902. A first elongate projection 922 fits into first elongate grooved connector 908, a second elongate projection 924 fits into second elongate grooved connector 910, a third elongate projection 926 fits into third elongate grooved connector 912, and a fourth elongate projection 928 fits into fourth elongate grooved connector 914.

In various embodiments, the elongate projections 922, 924, 926, and 928 fit snugly into respective elongate grooved connectors 908, 910, 912, and 914. The fit may be a force fit or a friction fit to securely hold the panel 900 to the side gate component substrate 902, but which may allow the panel and substrate to be later separated for repair or replacement of the panel for aesthetic purposes. In other embodiments, the elongate projections 922, 924, 926, and 928 may be secured into respective elongate grooved connectors 908, 910, 912, and 914 by use of an adhesive for a more permanent connection between the substrate and the panel. Other securing means, such as rivets, screws, nuts and bolts, may also be used to attach the panel 900 to the side gate component substrate 902.

The panel 900 also has a top lip 920, which is configured to abut against the top lip formed from the bottom side of channel 906 on the substrate 902.

In some embodiments, the channel 906 extends around the top of the side gates on a utility vehicle tray deck to allow for an edge of a tarpaulin to be force or friction fitted into the channel. The tarpaulin edge may include a rubber or plastic tube which is adapted to deform under sufficient force, so as to provide a more secure force fit for the tarpaulin edge into the channel 906.

Also shown in FIG. 9 is a substantially cylindrical bore 980 towards the bottom of side gate component 902. The bore 980 may be adapted for accepting a complementary protrusion to provide a hinged connection between the side gate component 902 and a tray of a utility vehicle.

Further shown in FIG. 9 is a top strip 904 which connects to the top of the side gate component 902, and which may provide a more aesthetically pleasing appearance to the side gate. The top strip 904 may also provide a protective surface for the side gate component, and which can be replaced if damaged at a far lesser cost than replacing or refurbishing the side gate component.

In the embodiment shown in FIG. 9, the deck side also uses the panel invention. The deck side has a deck side component substrate 940 including a square channel 942 for securing the deck (not shown in FIG. 9) of the utility vehicle. In some embodiments, the deck may comprise a plurality of connectable planks, the ends of which slide into the square channel 942. The deck side component substrate 940 also includes an apron 944 (sometimes referred to as coaming) depending from the upper portion of the deck side component 940, and to which the deck side panel 960 attaches.

The apron 944 includes elongate grooved connectors 946, 948, and 950, and the deck side panel includes complementary respective elongate projections 962, 964, and 966. Like the side gate component substrate 902 and the side gate panel 900, the grooved connectors and the elongate projections for the deck side may be connected together using friction or force fit, by use of adhesives and may also include various other securing means, such as rivets, screws, nuts and bolts.

Figure 10:
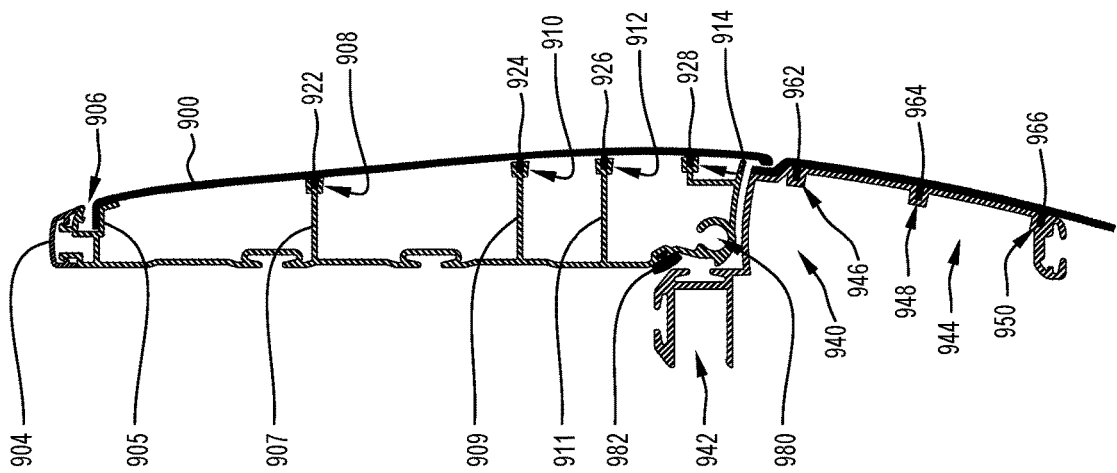
FIG. 10 is an end cross-sectional view of the side gate, including a side gate substrate and side gate panel from FIG. 9 shown as connected, along with the deck side, including a deck side substrate and deck side panel from FIG. 9 shown as connected; and, FIG. 11 is an end cross-sectional view of the side gate, including a side gate substrate and side gate panel from FIGS. 9 and 10 shown as disconnected, along with the deck side, including a deck side substrate and deck side panel from FIGS. 9 and 10 shown as disconnected.

FIG. 10 shows the connection between the side gate panel 900 and the side gate component substrate 902 via the elongate grooved connectors 908, 910, 912, and 914 and the complementary elongate projections 922, 924, 926, and 928. FIG. 10 also shows the connection between the deck side panel 960 and the deck side component substrate 940 via elongate grooved connectors 946, 948, and 950 and complementary respective elongate projections 962, 964, and 966.

Figure 11:
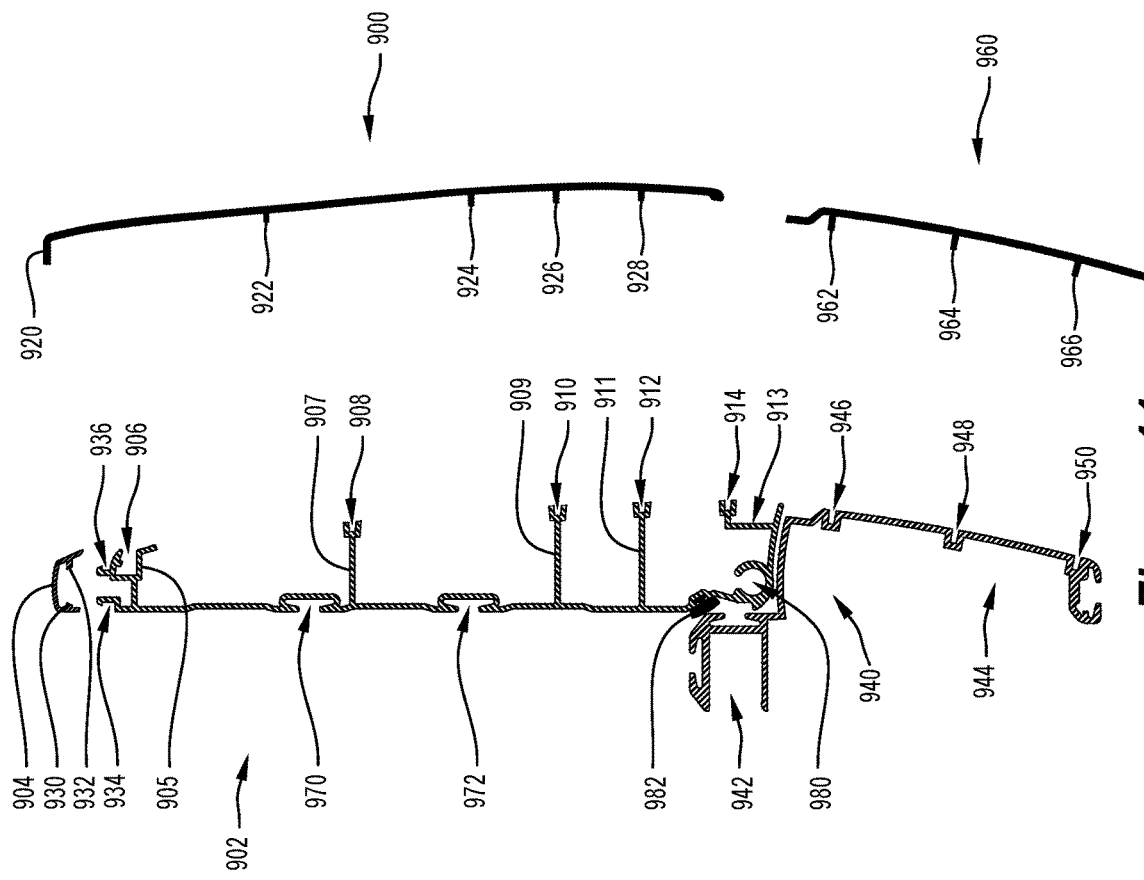

FIG. 11 shows the features of FIGS. 9 and 10 from an exploded end cross-sectional view, where the panels 900, 960 are shown separated from their respective substrates 902, 940 to more easily see some of the details of those features.

Also depicted in FIG. 11 is how the top strip 904 connects to the top of the side gate component 902 via a clipping means providing a force or friction fit. The side gate component substrate 902 includes outwardly projecting flanges 934 and 936, which engage inwardly projecting flanges 930 and 932 located in the hollow of the top strip 904.

It can also be seen in FIG. 11 that the side gate component substrate includes channels 970 and 972 formed in the side gate, which are useful for clipping and holding various items to the side gates of the utility vehicle tray deck.

The side gate component substrate 902 also has a rubber strip 982 which softens the contact between the side gate and the upper edge of the deck side component 940, against which the side gate rests when closed.

It will be appreciated that there are many other means of connecting a panel to a side gate component, just as there are many ways to connect a panel with any component to which the present invention is applied.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not and should not be taken as an acknowledgement or any form of suggestion that the prior art forms part of the common general knowledge.

The invention claimed is:

1. Apparatus for a tray deck for providing a selectable appearance outer surface for at least one component of the tray deck, the apparatus comprising:
   for the at least one component:
      a component substrate comprising a plurality of connectors for accepting a plurality of complementary connectors on a panel having a selected appearance for connection to the component substrate, wherein the panel, when connected to the component substrate, comprises at least part of the surface presenting outwardly of the tray deck, wherein each of the plurality of connectors on the component substrate comprises an elongate protrusion depending outwardly from the component substrate and along an edge of the elongate protrusion distal from the component substrate each connector comprising an elongate grooved connector, the elongate grooved connector configured to accept a complementary elongate projection of the panel.

2. Apparatus according to claim 1, wherein the at least one component comprises a side gate or a deck side of a tray deck.

3. Apparatus according to claim 1, wherein each elongate grooved connector and each complementary elongate projection of the panel connect with each other via force fit or friction fit.

4. Apparatus according to claim 1, wherein each elongate grooved connector and each complementary elongate projection of the panel are attached to each other using adhesive.

5. Apparatus according to claim 2, wherein the side gate component substrate further comprises at least one lower connector, each at least one lower connector for accepting a complementary lower connector on the panel, wherein each of the at least one lower connector on the side gate component substrate comprises an elongate protrusion depending upwardly and outwardly from a lower portion of the side gate component substrate, and along an edge of the elongate protrusion distal from the side gate component substrate each lower connector comprising an elongate grooved connector, the elongate grooved connector configured to accept a complementary elongate lower projection of the panel.

6. Apparatus according to claim 2, wherein the side gate component substrate further comprises a connector for connecting with a top strip, the top strip for providing a protective covering to the side gate component.

7. Apparatus according to claim 2, wherein the side gate component substrate further comprises a tarpaulin channel open outwardly of the side gate component substrate, the tarpaulin channel configured to accept an edge of a tarpaulin, such that the tarpaulin edge is force or friction fitted into the tarpaulin channel.

8. Apparatus according to claim 1, wherein the elongate grooved connector is configured to non-releasably accept a complementary elongate projection of the panel.

9. A system for a tray deck for providing a selectable appearance outer surface for at least one component of the tray deck, the system comprising:
for the at least one component:
a component substrate comprising a plurality of connectors for accepting a plurality of complementary connectors on a panel having a selected appearance for connection to the component substrate, wherein the panel, when connected to the component substrate, comprises at least part of the surface presenting outwardly of the tray deck, wherein each of the plurality of connectors on the component substrate comprises an elongate protrusion depending outwardly from the component substrate and along an edge of the elongate protrusion distal from the component substrate each connector comprising an elongate grooved connector, the elongate grooved connector configured to accept a complementary elongate projection of the panel; and,
the panel.

10. A system according to claim 9, wherein the at least one component comprises a side gate or a deck side of a tray deck.

11. A system according to claim 9, wherein each elongate grooved connector and each complementary elongate projection of the panel connect with each other via force fit or friction fit.

12. A system according to claim 9, wherein each elongate grooved connector and each complementary elongate projection of the panel are attached to each other using adhesive.

13. A system according to claim 10, wherein the side gate component substrate further comprises at least one lower connector, each at least one lower connector for accepting a complementary lower connector on the panel, wherein each of the at least one lower connector on the side gate component substrate comprises an elongate protrusion depending upwardly and outwardly from a lower portion of the side gate component substrate, and along an edge of the elongate protrusion distal from the side gate component substrate each lower connector comprising an elongate grooved connector, the elongate grooved connector configured to accept a complementary elongate lower projection of the panel.

14. A system according to claim 10, wherein the side gate component substrate further comprises a connector for connecting with a top strip, the top strip for providing a protective covering to the side gate component.

15. A system according to claim 10, wherein the side gate component substrate further comprises a tarpaulin channel open outwardly of the side gate component substrate, the tarpaulin channel configured to accept an edge of a tarpaulin, such that the tarpaulin edge is force or friction fitted into the tarpaulin channel.

16. A system according to claim 9, wherein the elongate grooved connector is configured to non-releasably accept a complementary elongate projection of the panel.

17. A method for a tray deck for providing a selectable appearance outer surface for at least one component of the tray deck, the method comprising:
providing an at least one component of the tray deck comprising a component substrate comprising a plurality of connectors for accepting a plurality of complementary connectors on a panel having a selected appearance for connection to the component substrate, wherein the panel, when connected to the component substrate, comprises at least part of the surface presenting outwardly of the tray deck, wherein each of the plurality of connectors on the component substrate comprises an elongate protrusion depending outwardly from the component substrate and along an edge of the elongate protrusion distal from the component substrate each connector comprising an elongate grooved connector, the elongate grooved connector configured to accept a complementary elongate projection of the panel; and,
providing the panel,
the method further comprising:
connecting the panel with the component substrate using the plurality of connectors of the component substrate and the plurality of complementary connectors on the panel.

18. A method according to claim 17, wherein the at least one component comprises a side gate or a deck side of a tray deck.

19. A method according to claim 17, wherein each elongate grooved connector and each complementary elongate projection of the panel connect with each other via force fit or friction fit.

20. A method according to claim 17, wherein the elongate grooved connector is configured to non-releasably accept a complementary elongate projection of the panel.

* * * * *